US005874956A

United States Patent [19]
LaHood

[11] Patent Number: 5,874,956
[45] Date of Patent: Feb. 23, 1999

[54] APPARATUS AND METHOD FOR THREE DIMENSIONAL MANIPULATION OF POINT OF VIEW AND OBJECT

[75] Inventor: Edward R. LaHood, Chicago, Ill.

[73] Assignee: Platinum Technology, Oakbrook Terrace, Ill.

[21] Appl. No.: 747,268

[22] Filed: Nov. 12, 1996

Related U.S. Application Data

[60] Provisional application No. 60/006,544 Nov. 13, 1995.

[51] Int. Cl.⁶ .......................................... G06F 3/00
[52] U.S. Cl. ............................................. 345/339
[58] Field of Search ..................... 345/333, 334, 345/339, 348, 349, 352, 353, 354, 419, 112, 121, 123, 126; 346/1, 39, 37

[56] References Cited

U.S. PATENT DOCUMENTS

| | | | |
|---|---|---|---|
| 5,263,134 | 11/1993 | Paal et al. | 345/342 |
| 5,551,693 | 9/1996 | Goto et al. | 463/37 |
| 5,579,026 | 11/1996 | Tabata | 345/8 |
| 5,664,132 | 9/1997 | Smith | 345/352 |
| 5,684,943 | 11/1997 | Abraham | 395/173 |

OTHER PUBLICATIONS

Wilson, Brian C., *Windows Sources,* vol. 3, No. 10, p. 198(1), Oct. 1995.
Mendelson, E., "Publish to the Web—No Experience Required", *PC Magazine,* vol. 14, No. 17, p. 203(5), Oct. 10, 1995.
"The Client Side of Virtual Worlds", Release 1.0, V. 94, No. 6, p. 12(7), Jun. 27, 1994.

"Flying mouse creates 3D computer interface," Inside R&D, (20 Feb. 1991) vol. 20, No. 8.

"CAD/CAM Outlook: . . . ," Manufacturing Automation, (1 May 1997) V. 6, N. 8.

*Primary Examiner*—A. Katbab
*Attorney, Agent, or Firm*—Wilson Sonsini Goodrich & Rosati

[57] ABSTRACT

An apparatus and related method permit viewer navigation and object manipulation within a three-dimensional graphical experience or "virtual world" displayed by a programmable digital computer. The apparatus and method include the display of a series of six buttons. Twenty-four operations are divided among the six buttons, with each button having two pairs of cooperating or complementary operations. Three of the buttons are used to accomplish movement of the viewer in relation to the three-dimensional virtual world, and the other three buttons are used to manipulate selected objects within the virtual world. A mouse cursor is used to select one of the buttons and to activate one of four quadrants associated with the selected button to accomplish the operation associated with the activated quadrant. When a button is selected, it expands from its inactivated or "at rest" state to a larger, activated state. Two adjacent quadrants may be activated to perform two operations concurrently. The speed of the movement is directly proportional to the distance of the mouse cursor from a dead zone in the selected button, thereby allowing the user to regulate the movement speed by appropriately positioning the mouse cursor. A software program displays the buttons, determines which of the buttons is activated, and calculates the amount, speed and direction of viewer movement or object manipulation as a function of the position of the mouse cursor.

34 Claims, 10 Drawing Sheets

APPARATUS AND METHOD FOR THREE DIMENSIONAL MANIPULATION OF POINT OF VIEW AND OBJECT

This application claims the priority of U.S. provisional application No. 6,544 filed on Nov. 13, 1995 by the present applicant.

A microfiche appendix consisting of 1 microfiche and 23 frames is included herein.

FIELD OF THE INVENTION

This invention relates to computers and, more particularly, to a software-driven apparatus and related method for navigating and interacting with three-dimensional graphics displayed on a monitor by a digital computer.

BACKGROUND OF THE INVENTION

The increasing speed and power of programmable, digital computers such as desk-top or personal computers, has made computer-generated, real-time, three-dimensional, graphical experiences both accessible and popular. Such experiences, generally referred to as "virtual reality", allow the personal computer user to navigate through and interact with computer-generated, three-dimensional virtual worlds. Such programs allow the user to appear to move about or through a virtual world in any number of directions and also allow the user to interact with and manipulate objects in that world, such as by grabbing selected objects, picking them up, carrying, moving or throwing them.

Navigating through and interacting with three-dimensional virtual worlds is generally accomplished by the user through manipulation of a computer input device, typically a mouse, to cause the computer program to perform certain movements or manipulations. This approach suffers from various drawbacks and disadvantages. In particular, the cursor of the mouse moves across the screen generally in only two dimensions, and such two-dimensional motion generally makes navigating and interacting with the three-dimensional virtual world not only difficult, but also counter-intuitive for the average user. The many possible movements available in the three-dimensional virtual worlds, referred to as "degrees of freedom", are thus not easily or intuitively accessible using conventional computer input devices.

Accordingly, there is a need for an apparatus and method which provides intuitive, efficient, and easy-to-use navigation and interaction within three-dimensional virtual worlds.

SUMMARY OF THE INVENTION

Therefore an object of this invention is to provide a new and improved apparatus which permits a digital computer user to navigate or manipulate objects within a virtual world, and to achieve many degrees of freedom for such navigation or manipulation.

Another object is to provide a method of programming a digital computer so that it presents a user interface which allows easy and intuitive navigation and interaction within the three-dimensional virtual world.

According to the present invention, the foregoing and other objects and advantages are attained by an apparatus which includes a digital computer and an appropriate monitor for displaying a virtual world generated by a computer program running on the digital computer. Part of the computer program displays a plurality of buttons which may be selected and manipulated by means of a mouse or other suitable computer input device.

According to one aspect of the invention, there are six buttons displayed in the apparatus, three of the buttons associated with navigating through the virtual world and three other buttons associated with manipulating objects within the virtual world. When a button is selected, it expands from its inactivated or "at rest" state to a larger, activated state. Each of the buttons in its activated state includes a so-called active area surrounding a so-called dead zone.

According to another aspect of the invention, the operations performed by activating the buttons are accomplished more rapidly in proportion to the distance from the location of the cursor placed within the active area to the dead zone.

Furthermore, each of the buttons is associated with four distinct operations which in turn are identified with specific locations on those buttons. The cursor may be placed between two of the locations, with the result that both of the operations associated with the locations on either side of the cursor are accomplished simultaneously. This can produce compound operations, such as diagonal movements consisting of two separate components simultaneously.

According to still another aspect of the invention, the buttons include two complementary or cooperative pairs of operations corresponding to two degrees of freedom which are frequently linked together when a user actually moves through three-dimensional space. The cooperative pairing of these operations provides an intuitive grouping of operations available on individual buttons to facilitate complex movement through or manipulation within a virtual world.

Still other objects, advantages, and novel aspects of the present invention will become apparent in the detailed description of the invention that follows. There, the preferred embodiment of the invention is shown by the attached drawings illustrating the best mode presently contemplated for carrying out the invention, and by describing it with reference to those drawings, in which:

DESCRIPTION OF THE INVENTION

In general terms, the present invention involves an apparatus which includes a programmable digital computer and a method of programming such digital computer so that a series of buttons is displayed on a monitor of the computer and accessible by a user to navigate through and manipulate objects in three-dimensional, virtual worlds which are displayed on the digital computer. Unlike conventional apparatus and methods for moving and manipulating within a virtual world, the present invention allows the user six degrees of freedom to operate within a three-dimensional virtual world by means of easy-to-use and intuitive buttons.

Figure 1:
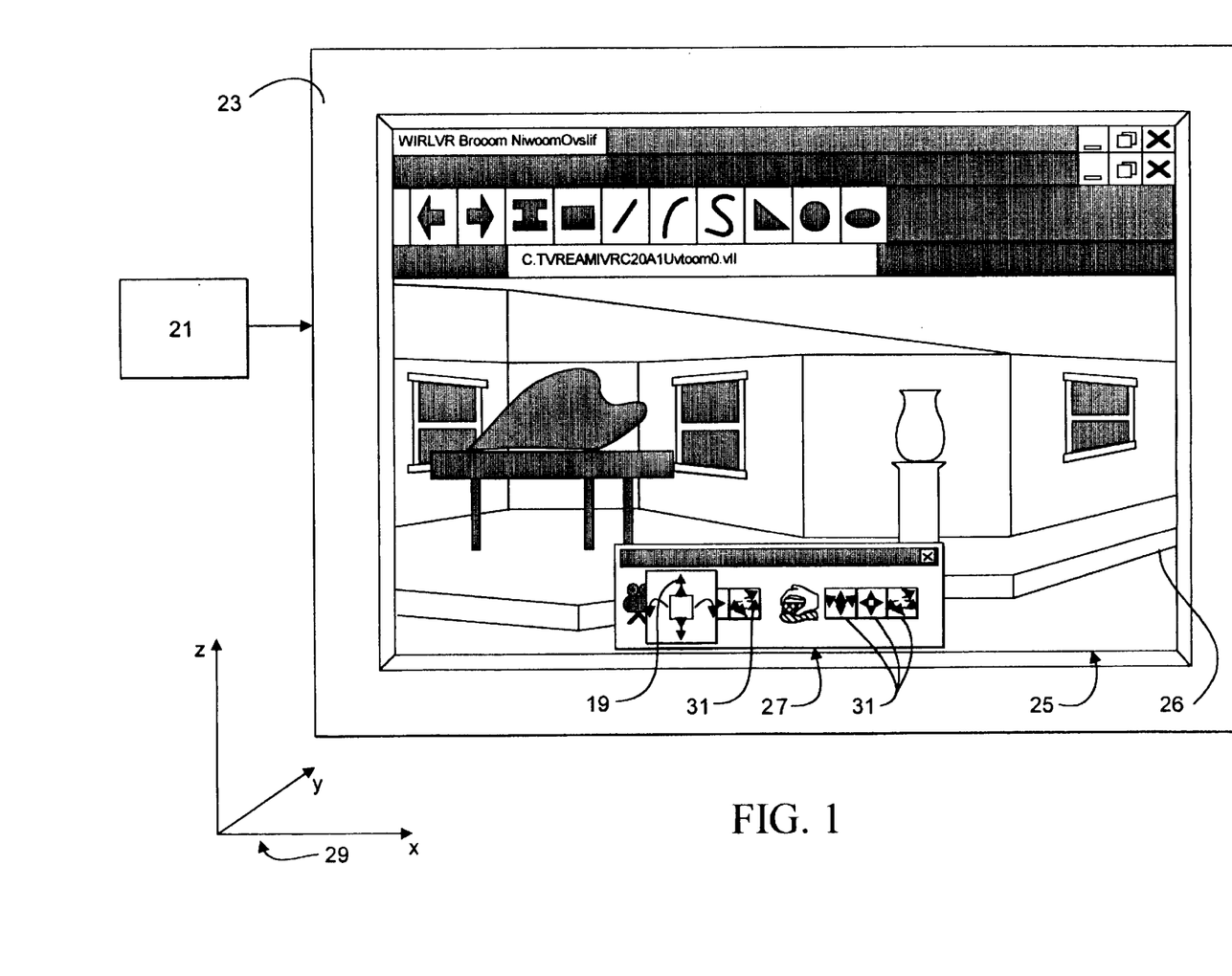
FIG. 1 is a schematic view of an apparatus according to the present invention showing the x, y and z directions of a three-dimensional, virtual world displayed by the apparatus.

Referring now to the drawings, and in particular to FIG. 1, a programmable, digital computer 21 runs a computer software application program which generates any of a variety of three-dimensional, graphical experiences (oftentimes referred to as a "virtual world"). In this particular embodiment, a real-time, three-dimensional virtual world is displayed on a two-dimensional screen 25 of monitor 23 associated with the computer 21. The three-dimensional image displayed on the screen 25 corresponds to the viewpoint of the user within the virtual world. This viewpoint will hereinafter be referred to as "the viewer."

Within a three-dimensional, virtual world, there are two fundamental types of operations which may be performed. First, the viewer may be moved through the virtual world (viewer navigation). For example, the viewer may walk through the room displayed on the screen 25. Second, objects within the virtual world may be manipulated by the user (object manipulation). For example, the user may move the base shown on the screen 25, open or shut one of the windows shown therein, or push the piano to a new location.

The present invention includes the display of a control pad, bar or window 27 which includes therein a series of buttons 31. The window 27 may be of any size sufficient to display the buttons and may be in any location on the screen 25, such as at the bottom center as shown in this embodiment, so long as the window 27 does not obscure the three-dimensional scene or otherwise inhibit operation of the computer program. Selective activation of the buttons 31 within the window 27, as discussed in detail below, permits the user to engage in both viewer navigation and object manipulation.

Viewer navigation and object manipulation within three-dimensional space may each be thought of as involving six degrees of freedom: three translational degrees of freedom, and three rotational degrees of freedom. These six degrees of freedom will be described with reference to the three-dimensional axes 29. Translational movement to the right or to the left of the screen 25 corresponds to movement along the x axis. Translational movement forward or backwards within the three-dimensional space of the screen 25 corresponds to movement along the y axis. Movement up or down within the three-dimensional space corresponds to movement along the z axis.

The three rotational degrees of freedom are as follows: pitching up or down corresponds to rotation about the x axis, rolling right or left corresponds to rotation about the y axis, and yawing right or left corresponds to rotation about the z axis.

Translational motion with respect to any of these axes can be in the positive direction indicated by the arrows of the axes 29 or in the negative direction away from the arrows corresponding to each of the axes 29. Likewise, rotation can be in the clockwise or counter-clockwise direction. Since there are six degrees of freedom and a positive and negative direction for each of the six degrees of freedom, a total of twelve operations are possible for viewer navigation and a corresponding twelve operations for object manipulation, making a total of 24 operations which are available within the three-dimensional virtual worlds shown on the screen 25.

Figure 2:
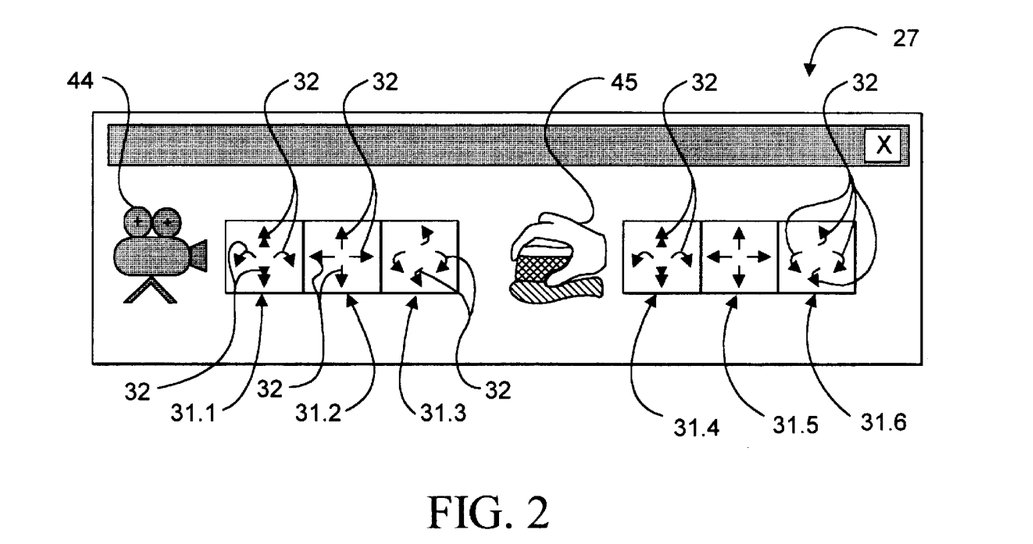
FIG. 2 is a front elevational view of a portion of the display of FIG. 1, showing six buttons according to the present invention.

Referring now to FIG. 2, the window 27 contains a series of six buttons 31.1–31.6. These buttons 31 are displayed by the computer program on the screen 25 as shown in FIG. 1. Three of these buttons 31.1, 31.2, and 31.3 control operations which accomplish navigational movement of the viewer through the three-dimensional, virtual world. These buttons 31.1–31.3 are therefore grouped together next to a camera icon 44 representing the viewer. The other three buttons 31.4, 31.5, and 31.6 perform operations related to object manipulation, and are grouped together next to a suitable hand icon 45 indicating object manipulation.

Each button 31 allows the user to have convenient and easy access to all six degrees of freedom and the twenty-four associated operations discussed above for either viewer navigation or object manipulation within the three-dimensional, virtual world. The twenty-four movement operations discussed above are divided among the six buttons 31, each of the buttons being associated with four of the operations. As will be seen in the description below, the four operations associated with each of the buttons 31 are selected so that each of the buttons 31 includes two complementary or cooperative pairs of operations. Such cooperative operations are then linked to make viewer navigation and objection manipulation particularly easy and intuitive for the user.

The buttons 31 are all shown in their inactivated or "at rest" state in FIG. 2. In this state, each of the buttons 31 has four arrows 32 disposed thereon, each of which represents one of the operations which that particular button 31 may perform. When any one of the buttons 31 is activated, such as by clicking on it with mouse cursor 19 (FIG. 1), the selected button 31 expands to approximately three times its original length and width.

The general structure and operation of the buttons 31 will now be discussed with particular reference to the button 31.1, which is shown in an expanded, activated state in FIG. 3. The button 31.1, when in its activated state, includes a central area or dead zone 33, which corresponds to the area that was originally taken up by the button 31.1 when it was in its inactivated state shown in FIG. 2. The dead zone 33 includes dimmed or obscure arrows 32' corresponding to the original arrows 32 of the button 31.1 when in its "at rest" state. The expansion feature provides the user with a visual indication of which one of the buttons 31.1–31.6 has been activated. While the mouse cursor 19 (FIG. 1) remains within the dead area 33 of the button 31.1 (FIG. 3), however, none of the four operations associated with the activated button 31.1 is performed.

By virtue of the expansion, an active area 35 is created which is located outside the dotted boundary line 36 of the dead zone 33. The active area 35 is divided into four quadrants 37a–d, each of which corresponds to one of the operations of the activated button 31.1. Each of the quadrants 37a–d contains corresponding arrows 39a–d which are configured so as to provide a visual indication of the operations corresponding to the respective quadrants 37a–d.

In the case of the button 31.1, the quadrants 37a and 37b correspond to movement of the viewer forward and backward, respectively, along the y axis within the three-dimensional virtual worlds shown on the screen 25 (FIG. 1). The operations of the quadrants 37c and 37d, on the other hand, yaw the viewer left and right, respectively, by rotation about the z axis (FIG. 1). The pair of operations corresponding to the quadrants 37a, 37b, and the pair corresponding to the quadrants 37c, 37d complement or cooperate with each other by allowing the viewer to move forward or backward within the virtual world and also to "look" to the left or to the right. The two cooperating degrees of freedom associated with the quadrants 37a, 37b and 37c, 37d thus simulate the actions of a person within the virtual world who is walking forward or backward and/or looking from side-to-side.

The operations of the quadrants 37a–d are accomplished as follows in this particular embodiment. The button 31.1 is activated selecting it with the mouse cursor 19. While holding down the selector button of the mouse (not shown), the mouse cursor 19 is moved into a selected one of the quadrants 37a–d of the button 31.1. For example, if the user moves the mouse cursor into the quadrant 37a of the button 31.1, then the viewer will start to move forward within the virtual world shown on the screen 25 (FIG. 1).

As the user moves the mouse cursor 19 farther from the central area or dead zone 33, the operation associated with the quadrant containing the cursor will be accomplished more quickly. The speed of the operation is thus proportional to the distance of the cursor from the boundary 36 of the area 33. As an example of this proportional motion, the further the mouse cursor is moved from the dead zone 33 within the quadrant 37a, the more quickly the viewer will advance forward along the y axis within the virtual world.

The active area 35 and the quadrants 37a–d therein are shown with an outer perimeter 41 within the window 27. However, the functional boundary of the active area 35 and the quadrants 37a–d extends beyond the perimeter 41 and fills the entirety of the screen 25 (FIG. 1). In operation, then, the mouse cursor 19 (FIG. 1) may be dragged beyond the outer perimeter 41 and the operations corresponding to the location of the cursor 19 will continue to be performed at a faster and faster rate as the distance from the dead zone 33 increases.

The locations of the quadrants 37a–d in relation to the dead zone 33 are selected to provide the viewer with a further indication of the operation associated with each of the quadrants. Thus, if the dead zone 33 is thought of as the location of the viewer, the quadrant 37a is located above the dead zone 33, or in front of the viewer. The arrow 39a thus points forward of the viewer, so that the quadrant 37a may be readily associated by the user with movement forward. Conversely, the quadrant 37b and its corresponding backward pointing arrow 39b are associated with backward movement.

The quadrants 37c and 37d are located to the sides of the viewer, i.e. the dead zone 33, and the arrows 39c and 39d point outwardly and are curved to convey rotation rather than translation. The quadrants 37c and 37d and their associated arrows 39c and 39d thus indicated the operations of side-to-side movement, comprising positive or negative rotation about the z axis.

The quadrants 37a–d are configured and programmed so that they overlap each other at diagonal regions 43 of the active area 35. Two adjacent ones of the quadrants 37a–d may be activated simultaneously by placing the mouse cursor in the overlapping diagonal area 43 between those quadrants. As an example of this simultaneous movement with respect to the button 31.1, if the user moves the mouse cursor into the diagonal area 43 which is at the upper right as shown in FIG. 3, then the viewer will start to move forward (positive translational movement with respect to the y axis of FIG. 1) and will simultaneously yaw to the right (clockwise rotation about the z axis of FIG. 1). In addition, like the rest of the active area 35, the diagonal regions 43 extend to fill the entirety of the screen 25, so that faster simultaneous operation can be achieved beyond the boundary 41.

The buttons 31.2–31.6 all operate in a manner similar to that describe above with reference to the button 31.1. The specific operations associated with each of the buttons 31.2–31.6 will now be described with reference to FIGS. 4–8. The button 31.2 is shown in its activated state in FIG. 4. The four operations of the button 31.2 allow the viewer to be displaced up or down (that is, by translational movement along the z axis of (FIG. 1)) and to the left or right (that is, by translational movement along the x axis). The active area 35 includes quadrants 47a and 47b which, when activated by the mouse cursor 19 (FIG. 1) accomplish movement up or down, respectively, along the z axis. Quadrants 47c and 47d, when activated by the mouse cursor, accomplish translational movement along the x axis.

Figure 4:
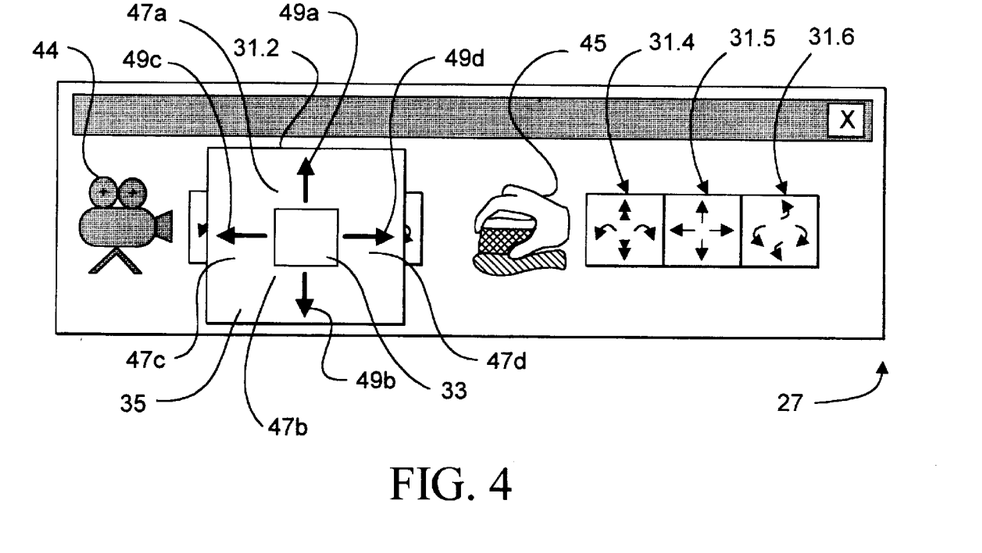
FIGS. 4–8 are front, elevational views of the buttons shown in FIG. 2, each showing a different one of the buttons activated.

The quadrants 47a–d are so located in relation to the dead zone 33, and include respective appropriately shaped and oriented arrows 49a–d, so as to provide the user with a readily discernable visual indication of the function of each of the quadrants 47a–d. In particular, the quadrants 47a and 47b are located above and below the dead zone 33, respectively, and the corresponding arrows 49a and 49b are vertically directed and straight. This arrangement facilitates recognition by the users that the viewer is displaced up or down along the z axis by operation of the quadrants 47a and 47b, respectively. Likewise, the quadrants 47c and 47d are located to either side of the dead zone 33 and are provided with outwardly directed and straight arrows 49c and 49d, thereby indicated translational, side-to-side movement.

The movement along the x axis alone or the z axis alone may be accomplished by activating the quadrants 47a–d alone, or such movements may be accomplished simultaneously by using diagonal zones as discussed earlier. The four operations of the button 31.2 are selected to provide two cooperating degrees of freedom. In particular, the viewer may move left or right within the image displayed by the screen 25, up or down within that image, or diagonally by simultaneously activating adjacent quadrants by means of the diagonal zones. All the operations of the quadrants 47a–d occur without advancing the viewer forward or backward within the virtual world.

Figure 5:
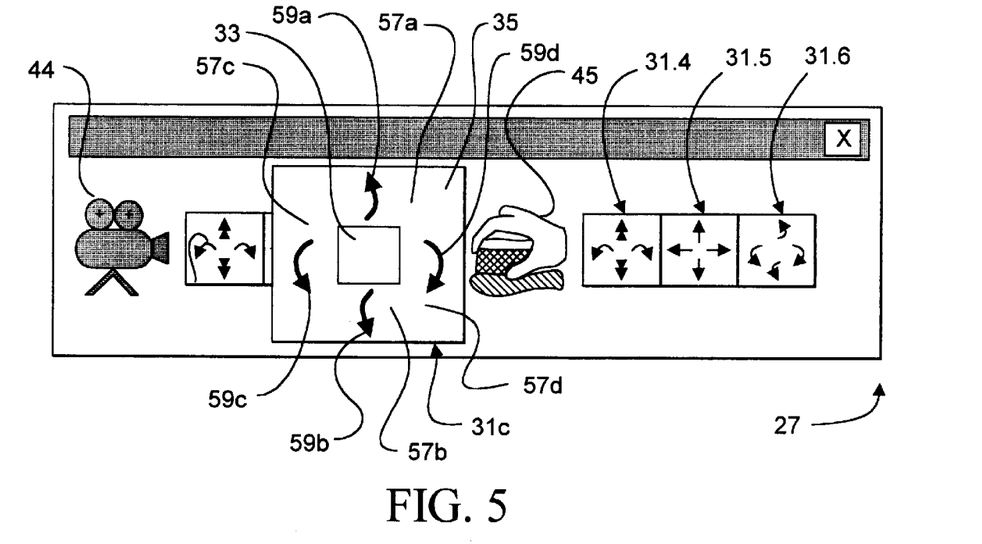

The button 31.3 is shown in its activated state in FIG. 5. A first pair of operations associated with the button 31.3 pitch the viewer up or down with respect to the image of the screen 25; that is, the viewer rotates about the x axis. The second pair of operations associated with the button 31.3 rolls the view left or right with respect to the image of the screen 25; that is, the viewer rotates about the y axis. The active area 35 of the button 31.3 is divided into quadrants 57a and 57b which rotate the viewer up or down about the x axis, respectively, when they are activated by the mouse cursor. Similarly, quadrants 57c and 57d rotate the viewer counter-clockwise, or clockwise, respectively, about the y axis when they are activated by the mouse cursor.

The quadrants 57a–d are so located in relation to the dead zone 33, and include respective appropriately shaped and oriented arrows 59a–d, so as to provide the user with a readily discernable visual indication of the function of each of the quadrants 57a–d. In particular, the quadrants 57a and 57b are located above and below the dead zone 33, respectively, and the corresponding arrows 59a and 59b are outwardly directed and curved to indicate rotation. This arrangement facilitates recognition by the user that the viewer is rotated up or down along the x axis by operation of the quadrants 57a and 57b respectively. Likewise, the quadrants 57c and 57d are located to either side of the dead zone 33, and are provided with outwardly directed and curved arrows to indicate rotation. This arrangement facilitates recognition by the user that the viewer is rotated counter-clockwise and clockwise about the y axis by operation of the quadrants 57c and 57d respectively.

The rotations about the x and y axes which are accomplished by the button 31.3 create two pairs of operations which result in cooperative degrees of freedom readily and intuitively understood by the user. In the case of the button 31.3, the combination of operations resembles an individual within the three-dimensional virtual world raising or lowering his or her head or tilting it from side to side.

Figure 6:
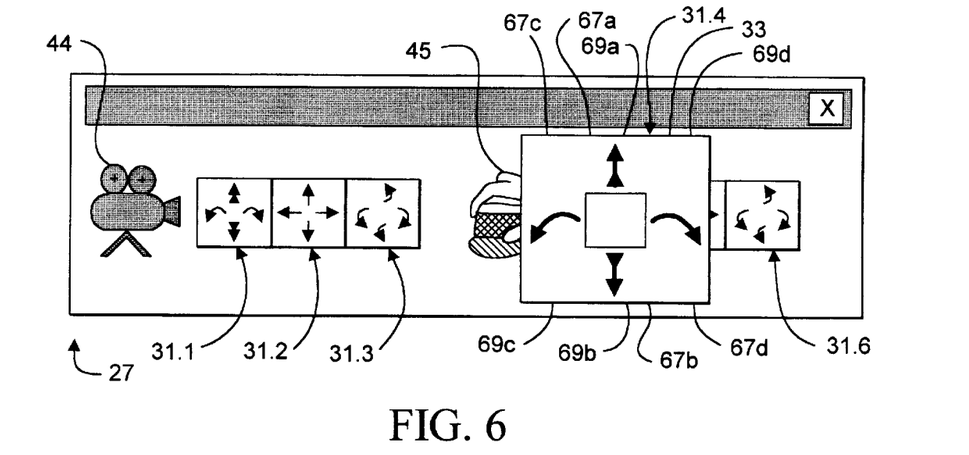
Figure 7:
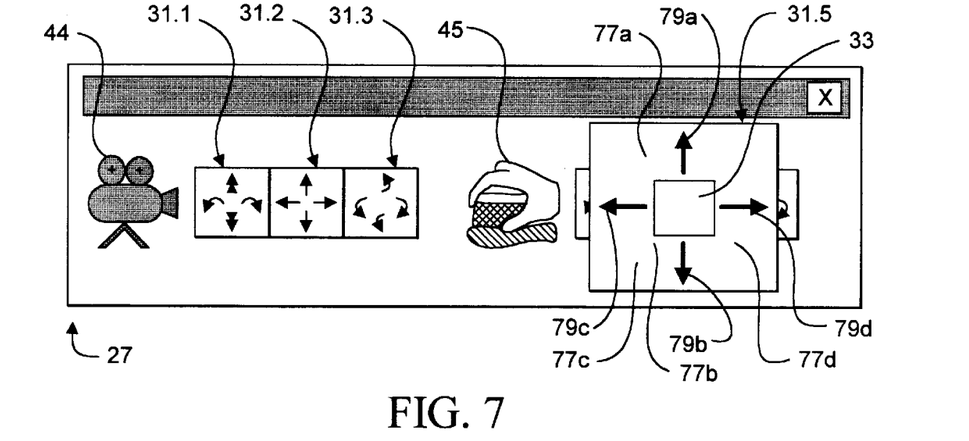
Figure 8:
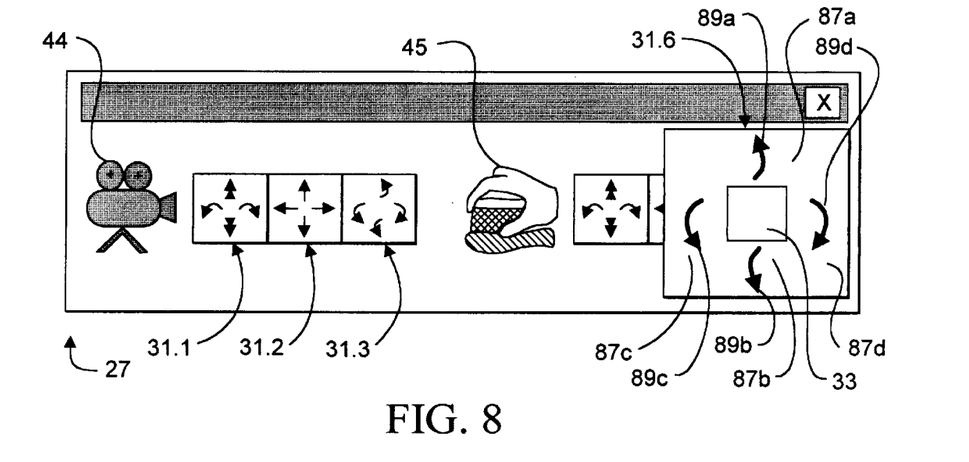

Referring now to FIGS. 6–8, the buttons 31.4, 31.5, and 31.6 are also provided with the cooperative pairs of translational and rotational operations similar to those discussed with reference to the buttons 31.1–31.3, except that the buttons 31.4–31.6 operate to manipulate objects rather than to move or rotate the viewer with respect to the virtual world. In addition, the same speed-proportionality feature is provided, even beyond the borders 41.

To use the button 31.4–31.6, then, an object within the virtual world is selected in accordance with the protocols of the computer software running on the computer 21, and the selected object is then manipulated, such as by moving the object or rotating the object relative to the three-dimensional space defined by the virtual world.

Rotation of the selected object discussed with reference to buttons 31.4–31.6 is described with reference to a set of xyz axes, such as those shown at 29 (FIG. 1), the zero points (0,0,0) of which are located within the selected object itself. For object manipulation, therefore, the rotation operations discussed below cause the selected object to rotate about one or more axes intersecting the selected object.

Referring to FIG. 6, the button 31.4 is shown in its activated state and controls two pairs of cooperative operations similar to those of the button 31.1. When the button 31.4 is operated, a selected object may be moved forward or backward within the three-dimensional virtual world, that is, positive and negative movement along the y axis; or the object may be yawed counter-clockwise or clockwise, that is, rotated about a z axis which extends through the selected object. As with the button 31.1, the button 31.4 includes quadrants 67a–d so located in relation to the dead zone 33, and arrows 69a–d which are appropriately shaped and oriented, so as to indicate to the user the respective operations associated with the quadrants 67a–d.

Referring to FIG. 7, the button 31.5 is shown in its activated state and includes two pairs of cooperative operations for object manipulation similar to those of the button 31.2 for viewer navigation. One pair of operations for the button 31.5 is used to move a selected object up or down relative to the space defined by the three-dimensional world, that is, positive or negative translational movement of the object along the z axis. The second pair of operations accomplishes translational movement left or right within the virtual world, that is, positive or negative movement along the x axis. As with the corresponding button 31.2, the button 31.5 includes quadrants 77a–d so located in relation to the dead zone 33, and arrows 79a–d which are appropriately shaped and oriented, so as to indicate to the user the operation associated with the quadrants 77a–d.

Referring now to FIG. 8, the button 31.6 is shown in its activated state and includes two pairs of cooperative operations for object manipulation similar to those of the button 31.3 for viewer navigation. One pair of operations of the button 31.6 pitches the selected object upward or downward, that is, rotates the selected object in the positive or negative direction about an x axis extending through the selected object. The other pair of operations available on the button 31.6 rolls a selected object in a counter-clockwise or clockwise direction, that is, rotates the object in a positive or negative direction about a y axis extending through the object. As with the corresponding button 31.3 for viewer navigation, the button 31.6 includes quadrants 87a–d so located in relation to the dead zone 33, and arrows 89a–d which are appropriately shaped and oriented so as to indicate to the user the operation associated with the quadrants 87a–d.

Referring again to FIGS. 1 and 2, the buttons 31.1–31.3 are arranged into a first group for viewer navigation, and the buttons 31.4–31.6 are arranged into a second group for object manipulation. Buttons 31.1–31.3 are arranged three in a row and the buttons 31.4–31.6 are arranged three in a row in a complementary fashion. That is, the first buttons 31.1 and 31.4 of each of the groups accomplish the same two pairs of operations for viewer navigation and object manipulation, respectively; the same is true for the middle buttons 31.2 and 31.5; and the same is true for the last buttons 31.3 and 31.6.

To operate the apparatus according to the present invention, the window or bar 27 is called up by a suitable software routine, such as the module labeled "MAINFRM-.CPP" in the microfiche appendix. The user determines where he or she wishes to go or which object to manipulate in the virtual world currently displayed on the screen 25 (FIG. 1). The user then selects the appropriate one of the buttons 31.1–31.6. While holding down the selector button, the user moves the mouse cursor 19 into the appropriate quadrant or quadrants of the selected button. The user determines the amount of the movement or manipulation by the time the mouse cursor is in the quadrant(s). The user determines the speed of the movement or manipulation by the distance of the mouse cursor from the dead zone 33. The process is then repeated as desired by the user with any of the buttons 31.1–31.6 to further navigate or manipulate objects within the virtual world.

When the user clicks on one of the buttons 31.1–31.6 to activate it, or releases the selector button to deactivate the button, a suitable software routine, such as that shown in the module labeled VRMCONTB.CPP in the microfiche appendix, displays the selected button in its expanded state or returns the selected button to its "at rest" state.

Figure 9A:
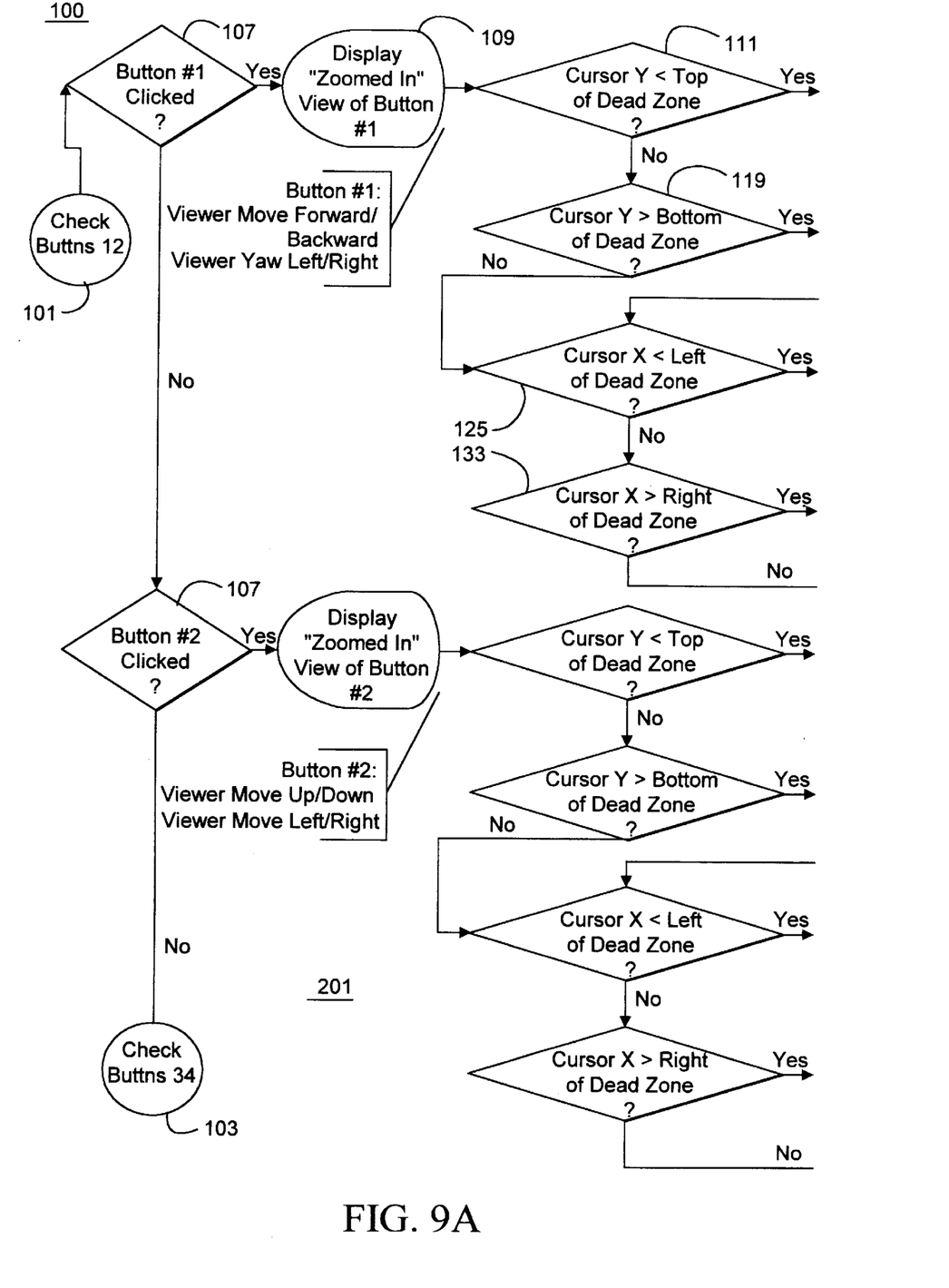
FIGS. 9a–9c are flow charts of a software program for a programmable digital computer incorporating the principles of the present invention.
Figure 9B:
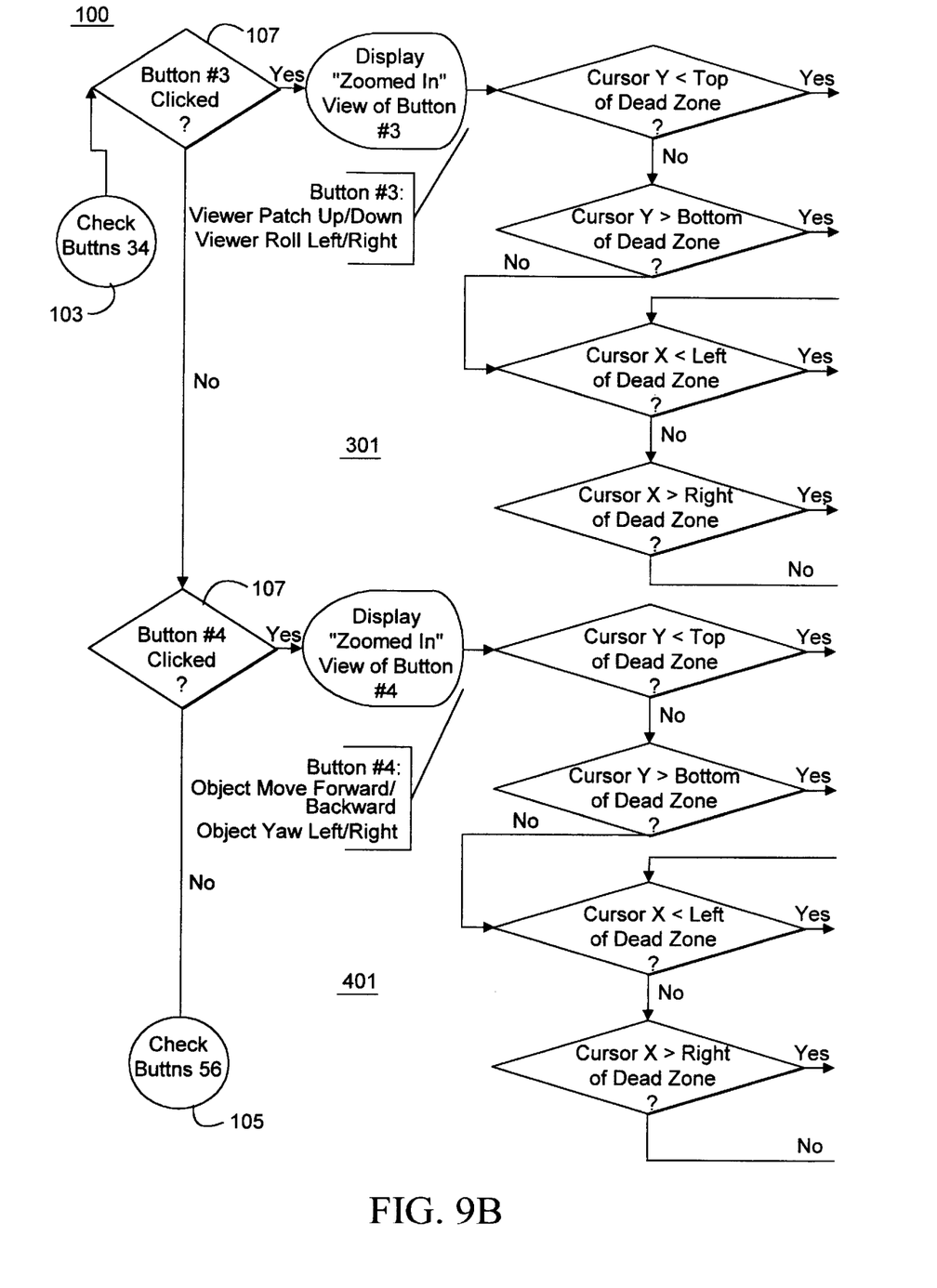
Figure 9C:
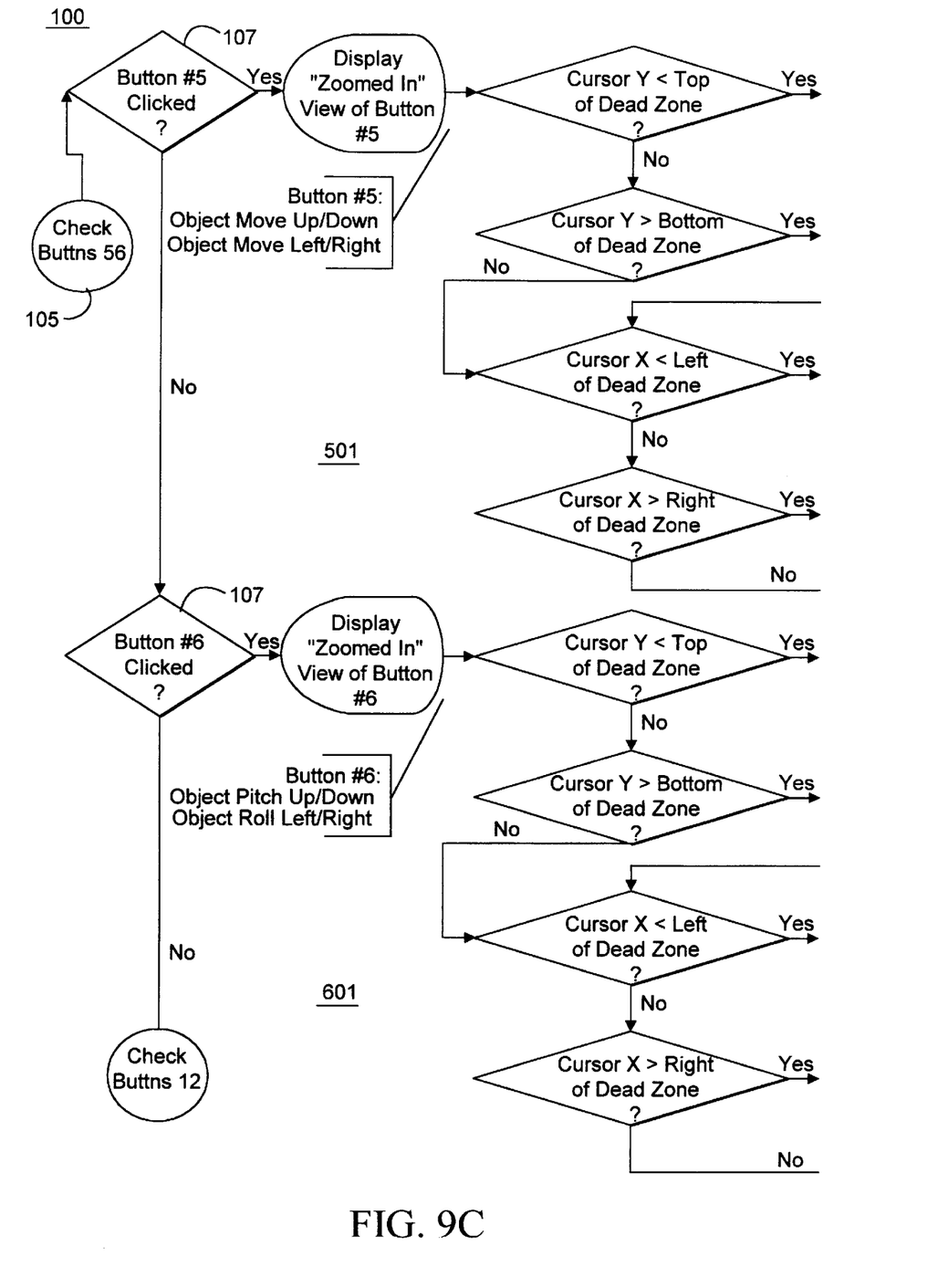

FIGS. 9a–c are a flow chart showing a suitable software program 100 according to the present invention for accomplishing the twenty-four translational and rotational operations controlled by the buttons 31.1–31.6, which are referred to as buttons #1–#6 respectively in FIGS. 9a–c. The software program 100 includes a suitable routine, shown in block 101, for checking whether the buttons 31.1 or 31.2 have been activated. If not activated, another program routine, block 103, checks whether the buttons 31.3 or 31.4 have been activated. If not, the program routine of block 105 checks whether the buttons 31.5 or 31.6 have been activated.

If any of the buttons 31.1–31.6 have been activated or "clicked," the branch labeled "yes" is followed from logic boxes 107. The performance of the four operations associated with each of the buttons 31.1–31.6 is then accomplished for the button activated or selected. The performance of the operations will be described for the button 31.1 referred to as "button #1" in the flow chart of FIG. 9. Performance of the operations associated with each of the other buttons 31.2–31.6 is accomplished in a similar fashion for the buttons #2, #3, #4, #5, and #6, respectively.

Figure 3:
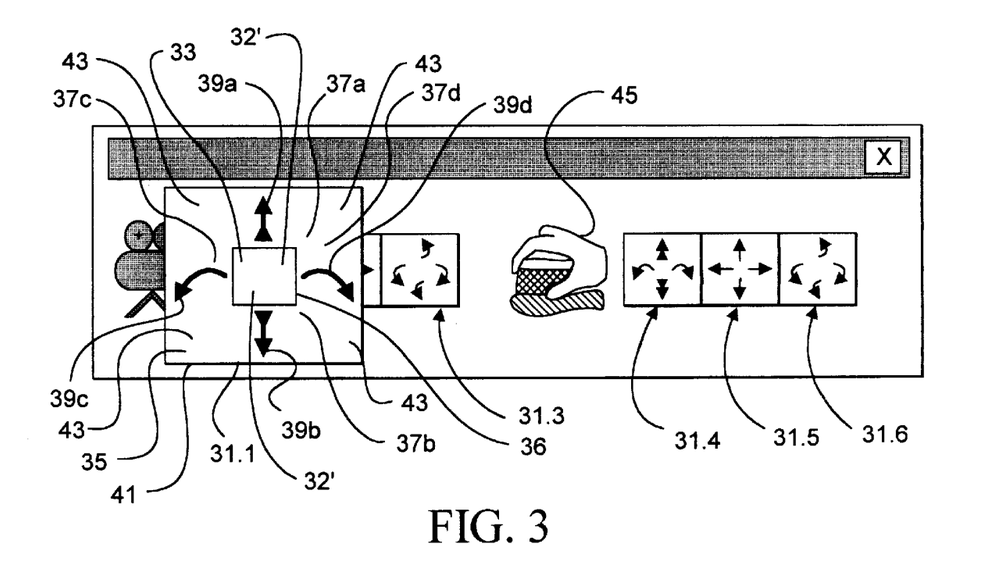
FIG. 3 is a front elevational view of the buttons of FIG. 2, with one of the buttons activated.

When the button 31.1 is activated, a software routine represented by program block 109 enlarges the button 31.1 and puts it into its activated state as shown in FIG. 3. It will be recalled that the button 31.1 moves the viewer either forward or backward along the y axis within the three-dimensional virtual world or yaws the view left or right (rotation about the z axis) within the three-dimensional virtual world. The program 100 then checks, in logic box 109, whether the mouse cursor is above the dead zone or area 33 (FIG. 3), that is, in the quadrant 39a corresponding to forward movement along the y axis. If yes, then the distance between the cursor location and the top of the dead zone 33 is calculated, as represented by the program block 113. This amount, referred to as the y distance or "Ydist," is used as the basis to calculate the distance to move the viewer forward as represented by the program block 115.

Proportional movement, that is, more rapid movement in proportion to increased distance from the dead zone 33, is accomplished by multiplying the y distance by a movement multiplier indicated as "move.mult" in program box 115. The product of the movement multiplier and the y distance is used in program block 117 to move the viewer along the y axis by the amount indicated by such product.

Returning to logic box 111, if the cursor is not positioned above the dead zone 33, then the program 100, as represented by the logic box 119, checks whether the cursor is located below the dead zone 33, that is, in the quadrant 39b corresponding to backward movement along the y axis (FIG. 3). If yes, then, in a manner similar to that discussed for calculating forward viewer movement, program block 121 determines the y distance between the cursor location and the bottom of the dead zone 33; and program block 123 multiplies such distance by the appropriate movement multiplier to accomplish proportional movement. The amount thus calculated is used to move the viewer backward along the y axis as done in program block 117 discussed previously.

After moving the viewer along the y axis as shown in the program block 117, or if the cursor is not located below the dead zone 33, then, as indicated by logic box 125, the software program 100 checks whether the mouse cursor is located to the left of the dead zone 33, that is, in the quadrant 39c (FIG. 3). If yes, then the x distance is calculated between the cursor location and the dead zone 33 by program block 127. Having calculated the x distance, proportional rotation is calculated in program block 129 in a manner similar to that used to calculate proportional movement in the program blocks 115, 123. In the case of the program block 129, the angle to yaw the viewer to the left is calculated and an appropriate rotation multiplier is used to increase the speed of rotation. The rotation is accomplished by taking the total viewer yaw units calculated in the program block 129 and performing the routine represented by program block 131 to yaw the viewer at the appropriate speed.

Returning to the logic box 125, if the cursor is not located to the left of the dead zone 33, then, as shown by logic box 133, the software program 100 checks whether the cursor is located to the right of the dead zone 33, that is, in the quadrant 37d. If yes, then the x distance between the cursor location and the dead zone 33 is calculated in program block 135. Then the appropriate speed at which to yaw the viewer to the right is calculated in program block 137, and the viewer is yawed at the appropriate rate to the right as shown in the program block 131.

After the viewer is yawed as set out in the program block 131, or if the cursor is not to the right of the dead zone 33, then the software program 100 checks whether the buttons 31.1 or 31.2 have been activated as indicated by the program circle 101 logically connected to the program blocks 131, 133.

Simultaneous or near simultaneous performance of two operations of the button 31.1 is accomplished by the logical connection of the two program blocks 117, 119 with the logic box 125. In particular, after the viewer has moved along the y axis as provided by the program block 117, the program 100 checks whether the cursor is to the left or to the right of the dead zone 33, thus calling for rotation left or right. In this way, when the cursor is displaced from the dead zone 33 both in the y direction and the x direction, the movement accomplished by the program block 117 and the yaw accomplished by the program block 131 are performed in such rapid succession that they appear to the user to be occurring simultaneously.

The operations of the buttons 31.2–31.6, referred to in FIGS. 9a–c as buttons #2–6, are accomplished by the software program 100 in the same way as described with reference to the button 31.1 above. In general terms, the position of the cursor relative to the dead zone 33 is checked, the distance from the cursor location to the dead zone is calculated, the appropriate speed of movement is determined, and the viewer or object is moved and/or rotated accordingly. The software routines for the buttons 31.2–31.6, which correspond to those discussed above for the button 31.1, are located in areas 201, 301, 401, 501, and 601, respectively, of the flow chart.

A suitable example of the program 100 is set out in source code form in a microfiche appendix and identified as module WIRL3VW.CPP.

Alternative embodiments of the present invention may vary the groupings of operations on the buttons to provide different pairs of cooperative or complementary operations. Such different pairs of operations may be useful, for example, to correspond to a particular set of movements dictated by the "physical" attributes or "laws of nature" of a particular three-dimensional virtual world.

The viewer navigation buttons and the object manipulations may be displayed in alternative formats on the screen 25, or they may be displayed in two separate windows or control panels. In further alternative embodiments, certain three-dimensional graphical experiences may require only a subset of the 24 operations and hence only a subset of the buttons 31.1–31.6 may be required for such embodiments.

In addition to the advantages apparent from the foregoing description, the invention provides an easy-to-use apparatus and related method for navigating and manipulating objects within a three-dimensional, virtual world using a two-dimensional input device, such as a mouse.

Such viewer navigation and object manipulation can be accomplished with the advantages and flexibility of 24 operations, which cover both translational and rotational movement. in all six degrees of freedom.

Although there are 24 available operations, they are grouped among only six buttons, rather than the 24 buttons which might otherwise be required. Such concise grouping means less clutter on the display screen, less usage of screen space, less potential confusion for the user when operating the user interface, and greater ease of operation along with enhanced intuitiveness.

Indeed, the principles of this invention permit the number of buttons to be reduced even further. In an alternative embodiment of the invention (which is not illustrated or represented in the program appendix), instead of two sets of three screen buttons each (one for viewer navigation and one for object manipulation as discussed above), there is only one set of three control buttons, and that set is programmed to function alternately as either the viewer navigation controls or the object manipulation controls, depending on a mode setting. In addition, there is a mode button on screen which is used to toggle that mode setting between viewer navigation and object manipulation. Consequently, in this alternative embodiment of the invention all 24 of the viewer navigation and object manipulation functions may be controlled with a grand total of only three control buttons and one mode button on screen.

A related advantage is that the buttons expand in size only when they are activated, otherwise remaining at a smaller size. The smaller size of the buttons when in their inactive state reduces screen clutter and screen usage, while still allowing the users to see the location of the inactive buttons and thus allowing ready access to them.

The operations for each of the buttons have been grouped into pairs of operations which complement or cooperate with each other to provide the user with an intuitive combination of motions for each of the buttons.

The buttons according to the present invention have the further advantage of providing proportional motion. The user may thereby adjust the speed of the operation currently being performed, in contrast to the conventional on/off functionality of the current art, which provides the user with only one speed for the selected operation.

In addition, the proportionability function is available across the entire screen, thereby giving the user more space to operate, and thus finer control over, the proportional motion.

The buttons also advantageously allow for simultaneous or compound movement by activating two operations of a selected button at the same time or concurrently.

While the present invention has been described with reference to a preferred embodiment thereof, illustrated in the accompanying drawings, various changes and modifications can be made by those skilled in the art without departing from the spirit and scope of the present invention.

The invention claimed is:

1. For use with a programmable digital computer having a visual display means capable of displaying a pointer, and a user-operated pointing device for controlling the location of said pointer on said display means, a virtual reality program comprising code to cause said computer to display on said display means a three dimensional scene as seen from a selected point of view and containing a representation of at least one object;

code to cause said computer to display on said display means at least a first button area and a second button area;

and code to cause said computer to change the selected point of view of said scene in a prescribed manner when said first button area is invaded by said pointer, and to move said object within said scene in a prescribed manner when said object is selected in a prescribed manner and said second button area is invaded by said pointer.

2. A program as in claim 1 which translates at least one of said point of view or said object forward when a first portion of at least one of said button areas is invaded by said pointer, and backward when a second portion of at least one of said button areas is invaded by said pointer.

3. A program as in claim 2 in which said first portion is located in the upper region of at least one of said button areas, and said second portion is located in the lower region of at least one of said button areas.

4. A program as in claim 3 in which said first portion contains a display of a straight arrow pointing substantially upwardly, and said second portion contains a display of a straight arrow pointing substantially downwardly.

5. A program as in claim 1 which moves said point of view as though the viewer had yawed to the left or yaws said object to the left when a first portion of at least one of said button areas is invaded by said pointer, and to the right when a second portion of at least one of said button areas is invaded by said pointer.

6. A program as in claim 5 in which said first portion is located on the left side of at least one of said button areas, and said second portion is located on the right side of at least one of said button areas.

7. A program as in claim 6 in which said first portion contains a display of an arrow curving to the left, and said second portion contains a display of an arrow curving to the right.

8. A program as in claim 1 which translates at least one of said point of view or said object upwardly when a first portion of at least one of said button areas is invaded by said pointer, and downwardly when a second portion of at least one of said button areas is invaded by said pointer.

9. A program as in claim 8 in which said first portion is located in the upper region of at least one of said button areas, and said second portion is located in the lower region of at least one of said button areas.

10. A program as in claim 9 in which said first portion contains a display of a straight arrow pointing substantially upwardly, and said second portion contains a display of a straight arrow pointing substantially downwardly.

11. A program as in claim 1 which translates at least one of said point of view or said object to the left when a first portion of at least one of said button areas is invaded by said pointer, and to the right when a second portion of at least one of said button areas is invaded by said pointer.

12. A program as in claim 11 in which said first portion is located on the left side of at least one of said button areas, and said second portion is located on the right side of at least one of said button areas.

13. A program as in claim 12 in which said first portion contains a display of a straight arrow pointing substantially to the left and said second portion contains a display of a straight arrow pointing substantially to the right.

14. A program as in claim 1 which, when a first portion of at least one of said button areas is invaded by said pointer, performs at least one of, moving said point of view as though the viewer had pitched upwardly, or pitching said object upwardly, and when a second portion of at least one of said button areas is invaded by said pointer, performs at least one of, moving said point of view as though the view had pitched downwardly, or pitching said object downwardly.

15. A program as in claim 14 in which said first portion is located in the upper region of at least one of said button areas, and said second portion is located in the lower region of at least one of said button areas.

16. A program as in claim 15 in which said first portion contains a display of an arrow curving upwardly, and said second portion contains a display of an arrow curving downwardly.

17. A program as in claim 1 which, when a first portion of at least one of said button areas is invaded by said pointer, performs at least one of, moving said point of view as though the viewer had rolled to the left, or rolls said object to the left, and when a second portion of at least one of said button areas is invaded by said pointer, performs at least one of, moving said point of view as though the viewer had rolled to the right, or rolls said object to the right.

18. A program as in claim 17 in which said first portion is located on the left side of at least one of said button areas, and said second portion is located on the right side of at least one of said button areas.

19. A program as in claim 18 in which said first portion contains a display of an arrow curving to the left, and said second portion contains a display of an arrow curving to the right.

20. A program as in claim 1 by which the speed of said viewer navigation or object manipulation is varied as a function of the location of said pointer relative to at least one of said button areas.

21. A program as in claim 1 which provides a dead zone portion of one of said button areas, within which dead zone said pointer may reside without changing said selected point of view of said scene or moving said object within said scene.

22. A program as in claim 21 which locates said dead zone at substantially the center of said button area, and by which the speed of said viewer navigation or object manipulation is increased with increasing distance of said pointer from said dead zone.

23. A program as in claim 22 which continues to increases said speed as a function of said increasing distance even when said pointer passes beyond the outer bounds of said button area.

24. A program as in claim 1 by which said computer is caused to activate a button area for the purpose of viewer navigation or object manipulation when said button area is selected by said pointing device, and also at that time said computer is caused to change the appearance of said selected button area noticeably whereby to signify to the user that said selected button area is currently activated.

25. A program as in claim 24 which is arranged to display a plurality of said button areas which produce different viewer navigations or object manipulations from each other, and arranged so that only one of said button areas may be activated at any one time.

26. A program as in claim 25 in which said noticeable change in appearance is a substantial increase in the size of the currently activated button area relative to the other button areas, whereby to distinguish it from those others and to enhance its visibility when it is activated, but to conserve space on said display means at other times.

27. A program as in claim 1:

which provides a dead zone portion within one of said button areas, within which dead zone said pointer may reside without changing said selected point of view of said scene or moving said object within said scene;

by which said computer is caused to activate a button area for the purpose of viewer navigation or object manipulation when said button area is selected by said pointer, said button area initially being substantially coextensive in size and shape with said dead zone;

and which causes said computer, at the time said button area is activated, to substantially increase the size of the currently activated button area beyond the bounds of said dead zone, whereby to distinguish it from those others and to enhance its visibility when it is activated, but to conserve space on said display means at other times, and to provide an active area outside said dead zone wherein said pointer may produce said viewer navigation or object manipulation operation.

28. A program as in claim 1 by which said computer is caused:

to produce a viewer navigation or object manipulation operation in a first direction when said pointer invades a first portion of at least one of said button areas;

and to produce a viewer navigation or object manipulation operation in the opposite direction when said pointer invades a second portion of at least one of said button areas.

29. A program as in claim 28 in which said first and second portions are diametrically located relative to each other with respect to said button area.

30. A program as in claim 29 by which said computer is caused:

to produce a viewer navigation or object manipulation operation in a first direction when said pointer invades a first quadrant of at least one of said button areas;

to produce a viewer navigation on or object manipulation operation in the opposite direction when said pointer invades a second quadrant which is diametrically opposite to said first quadrant of at least one of said button areas;

to produce a viewer navigation or object manipulation operation in a second direction when said pointer invades a third quadrant of at least one of said button areas;

and to a produce viewer navigation or object manipulation operation in a direction opposite to said second direction when said pointer invades a quadrant of at least one of said button areas diametrically opposite to said third quadrant.

31. A program as in claim 30 by which, when said pointer invades a diagonal region near the border between two adjacent quadrants, said computer is caused to produce concurrently both of the viewer navigation or object manipulation operations which are assigned to said adjacent quadrants.

32. In a programmable digital computer having a visual display means capable of displaying a pointer, coupled with a user-operated pointing device for controlling the location of the pointer on the display means, a method comprising:

displaying on the display means a three dimensional scene as seen from a selected point of view and containing a representation of at least one object;

displaying on the display means at least a first button area and a second button area;

and changing the selected point of view of the scene in a prescribed manner when the first button area is invaded by the pointer, and moving the object within the scene in a prescribed manner when the object is selected in a prescribed manner and the second button area is invaded by the pointer.

33. The method of claim 32, comprising:

translating at least one of the point of view or the object forward when a first portion of at least one of the button areas is invaded by the pointer, and backward when a second portion of at least one of the button areas is invaded by the pointer;

moving the point of view as though the viewer had yawed to the left or yawing the object to the left when a third portion of at least one of the button areas is invaded by the pointer, and to the right when a fourth portion of at least one of the button areas is invaded by the pointer;

translating at least one of the point of view or the object upwardly when a fifth portion of at least one of the button areas is invaded by the pointer, and downwardly when a sixth portion of at least one of the button areas is invaded by the pointer;

translating at least one of the point of view or the object to the left when a seventh portion of at least one of the button areas is invaded by the pointer, and to the right when a eighth portion of at least one of the button areas is invaded by the pointer;

when a ninth portion of at least one of the button areas is invaded by the pointer, performing at least one of,
  moving the point of view as though the viewer had pitched upwardly, or
  pitching the object upwardly;

when a tenth portion of at least one of the button areas is invaded by the pointer, performing at least one of,
  moving the point of view as though the view had pitched downwardly, or
  pitching the object downwardly;

when an eleventh portion of at least one of the button areas is invaded by the pointer, performing at least one of,
  moving the point of view as though the viewer had rolled to the left, or
  rolling the object to the left; and when a twelfth portion of at least one of the button areas is invaded by the pointer, performing at least one of,
  moving the point of view as though the viewer had rolled to the right, or
  rolling the object to the right.

34. The method of claim 33, wherein the first portion is located in the upper region of at least one of the button areas, the second portion is located in the lower region of at least one of the button areas, the first portion contains a display of a straight arrow pointing substantially upwardly, and the second portion contains a display of a straight arrow pointing substantially downwardly;

the third portion is located on the left side of at least one of the button areas, the fourth portion is located on the right side of at least one of the button areas, and the third portion contains a display of an arrow curving to the left, and the fourth portion contains a display of an arrow curving to the right;

the fifth portion is located in the upper region of at least one of the button areas, the sixth portion is located in the lower region of at least one of the button areas, the fifth portion contains a display of a straight arrow pointing substantially upwardly, and the sixth portion contains a display of a straight arrow pointing substantially downwardly;

the seventh portion is located on the left side of at least one of the button areas, the eighth portion is located on the right side of at least one of the button areas, the seventh portion contains a display of a straight arrow pointing substantially to the left, and the eighth portion contains a display of a straight arrow pointing substantially to the right;

the ninth portion is located in the upper region of at least one of the button areas, the tenth portion is located in the lower region of at least one of the button areas, the ninth portion contains a display of an arrow curving upwardly, and the tenth portion contains a display of an arrow curving downwardly; and the eleventh portion is located on the left side of at least one of the button areas, the twelfth portion is located on the right side of at least one of the button areas, the eleventh portion contains a display of an arrow curving to the left, and the twelfth portion contains a display of an arrow curving to the right.

* * * * *